(12) United States Patent
Splane

(10) Patent No.: US 6,622,656 B1
(45) Date of Patent: Sep. 23, 2003

(54) PEST RESISTANT PET FOOD FEEDER

(76) Inventor: Robson L. Splane, 10850 White Oak Ave., Granada Hills, CA (US) 91344

( * ) Notice: Subject to any disclaimer, the term of this patent is extended or adjusted under 35 U.S.C. 154(b) by 0 days.

(21) Appl. No.: 10/237,498

(22) Filed: Sep. 9, 2002

Related U.S. Application Data
(60) Provisional application No. 60/348,992, filed on Jan. 16, 2002.

(51) Int. Cl.[7] .................................................. A01K 5/01
(52) U.S. Cl. ........................................................ 119/62
(58) Field of Search ............................ 119/51.01, 53.5, 119/54, 62; D30/130

(56) References Cited

U.S. PATENT DOCUMENTS

| | | | | |
|---|---|---|---|---|
| 3,121,419 A | * | 2/1964 | Gillespie | 119/62 |
| 3,176,656 A | * | 4/1965 | Bates | 119/62 |
| 4,175,516 A | * | 11/1979 | Savage | 119/62 |
| 4,793,290 A | * | 12/1988 | O'Donnell | 119/62 |
| D323,411 S | * | 1/1992 | Oathout | D30/130 |
| 5,349,925 A | * | 9/1994 | Zerato et al. | 119/62 |
| 5,649,499 A | * | 7/1997 | Krietzman et al. | 119/62 |
| 6,446,574 B2 | * | 9/2002 | Bickley | 119/62 |

* cited by examiner

*Primary Examiner*—Charles T. Jordan
*Assistant Examiner*—Elizabeth Shaw
(74) *Attorney, Agent, or Firm*—Roger A. Marrs

(57) ABSTRACT

A pest resistant pet feeder having a base providing a moat or barrier for insects supports a pivoting platform with openings at one end for removably mounting a pair of pet food and water dishes. The one end includes a transparent lid pivotally attached to the one end for covering and uncovering the dishes. A linkage assembly extending between the platform and the lid translates pivotal movement of the platform in response to weight of a pet into deploying the lid into its dish uncovering position. Departure of the pet actuates the linkage via the pivot movement of the platform to position the lid to cover the dishes.

11 Claims, 4 Drawing Sheets

PEST RESISTANT PET FOOD FEEDER

Priority Claimed on Ser. No. 60/348,992 of provisional application No. filed Jan. 16, 2002.

BACKGROUND OF THE INVENTION

1. Field of the Invention

The present invention relates generally to pet feeder and more specifically it relates to a pest resistant pet food feeder for providing a pet feeder which will allow pets to feed at will, but which also protects the pet food and water from infestations of crawling, hopping and flying pests. The pet feeder would also provide a means for keeping food moist longer, while at the same time minimize unpleasant pet food odors in and around the home or work place.

2. Description of the Related Art

It can be appreciated that pet feeders have been in use for years. Typically, pet feeders are comprised of simple bowls and dishes, some feeders have water moats which protect the contents from many small crawling insects, and at least one feeder has a lid which is triggered by a timer.

The main problem with conventional pet feeders is none of the feeders allow the pet to feed, at will, while also protecting the food and water from infestation from all forms of pests including those which crawl, jump and fly. Another problem with conventional pet feeders is they do not aid in keeping the food moist. Another problem with conventional pet feeders is that they do not inhibit the disbursement of unpleasant odors associated with many pet foods.

While these devices may be suitable for the particular purpose to which they address, they are not as suitable for providing a pet feeder which will allow pets to feed at will, but which also protects the pet food and water from infestations of crawling, hopping and flying pests. The pet feeder would also provide a means for keeping food moist longer, while at the same time minimize unpleasant pet food odors in and around the home or work place. The main problem with conventional pet feeder are none of the feeders allow the pet to feed, at will, while also protecting the food and water from infestation from all forms of pests including those which crawl, jump and fly. Another problem is they do not aid in keeping the food moist. Also, another problem is that they do not inhibit the disbursement of unpleasant odors associated with many pet foods.

In these respects, the pest resistant pet food feeder, according to the present invention, substantially departs from the conventional concepts and designs of the prior art, and in so doing provides an apparatus primarily developed for the purpose of providing a pet feeder which will allow pets to feed at will, but which also protects the pet food and water from infestations of crawling, hopping and flying pests. The pet feeder would also provide a means for keeping food moist longer, while at the same time minimize unpleasant pet food odors in and around the home or work place.

SUMMARY OF THE INVENTION

In view of the foregoing disadvantages inherent in the known types of pet feeder now present in the prior art, the present invention provides a new pest resistant pet food feeder construction wherein the same can be utilized for providing a pet feeder which will allow pets to feed at will, but which also protects the pet food and water from infestations of crawling, hopping and flying pests. The pet feeder would also provide a means for keeping food moist longer, while at the same time minimize unpleasant pet food odors in and around the home or work place.

The general purpose of the present invention, which will be described subsequently in greater detail, is to provide a new pest resistant pet food feeder that has many of the advantages of the pet feeder mentioned heretofore and many novel features that result in a new pest resistant pet food feeder which is not anticipated, rendered obvious, suggested, or even implied by any of the prior art pet feeder, either alone or in any combination thereof.

To attain this, the present invention generally comprises the moat/base, the main support platform, the feeding platform (with padded surface), removable food & water bowls, the linkage Assembly, and the lid. The base is formed to hold water like a moat, while supporting (and isolating) the main support platform above the moat on three ascending telescoping columns. The moat/base itself is supported off the ground by 4 non-skid rubber feet. The main support platform acts as the structure to support the feeding platform, the food and water bowls and the lid. The main support has 3 descending columns which telescope into the ascending columns in the moat/base. The main support is removable from the moat/base for easy cleaning and filling of the moat. The feeding platform is hinged to the main support platform and acts as the ever arm, or pressure plate, so the weight of the pet standing on the feeding platform will actuate the linkage assembly and open the lid. The upper surface of the feeding platform is covered with a rubber padding which provides improved traction as well as insulation for the pet. Two removable bowls are supplied for food and or water. These are of a canular shape which is large enough to hold a standard sized cat food can and still allow the lid to close. These bowls can be manufactured of plastic, steel or aluminum, and are supported in holes located in the upper surface of the main support platform. The linkage assembly translates the downward motion of the feeding platform into the upward motion, or opening motion, of the lid. The assembly is comprised of 3 main parts, and their pivot fasteners. A lever arm which pivots near its center, and 2 linkages secured, and pivoting, at either terminus/end of the lever. The central lever arm is mounted (and pivots) near its center to a mounting bracket which descends from the lower surface of the main support structure. The bracket is located between and below the two holes for the bowls. The lever pivots vertically on the bracket. Ascending from both ends of the lever are two pivoting linkages. The upper end of the linkage (towards the foot of the feeder) connects to and pivots on, a bracket descending from the underside of the feeding platform, and transfers downward pressure from the platform to the lever. This motion causes the other linkage, whose upper end is secured to and pivots on a bracket which descends from the under side of the lid, to travel upwards and open the lid. The lid covers the food and water bowls, and can be opened automatically when the weight of the pet depresses the feeding platform. The lid pivots vertically on the main support platform. Its having pivot points which mate at both lateral sides of the platform. Located near the center line and descending from the underside of the lid is a bracket to which a linkage is pivoted. The linkage transmits lifting, or opening motion, from the feeder platform, through the linkage assembly and finally to the lid. Also located on the underside of the lid is a gasket of foam or elastomer which seals the lid against the main support platform.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a pest resistant pet food feeder that will overcome the shortcomings of the prior art devices.

An object of the present invention is to provide a pest resistant pet food feeder for providing a pet feeder which will allow pets to feed at will, but which also protects the pet food and water from infestations of crawling, hopping and flying pests. The pet feeder would also provide a means for keeping food moist longer, while at the same time minimize unpleasant pet food odors in and around the home or work place.

Another object is to provide a pest resistant pet food feeder that can protect pet food and water from crawling, hopping and flying insects, by raising the feeding platform, surrounding it by a water moat and automatically covering the food and water when the pet is not actively feeding.

Another object is to provide a pest resistant pet food feeder that will allow pets to feed "at will".

Another object is to provide a pest resistant pet food feeder that includes designs, and sizes of designs, which helps to facilitate the use of the feeders by pets of different sizes and species.

Another object is to provide a pest resistant pet food feeder that aids in keeping the food moist longer.

Another object is to provide a pest resistant pet food feeder that includes a clear lid which allows for easy monitoring of food and water levels.

Another object is to provide a pest resistant pet food feeder that includes food and water bowls which may be removable for easy filling and cleaning.

Another object is to provide a pest resistant pet food feeder that includes food bowls which can hold a standard sized pet food can, with the lid removed, and the contents left inside the can.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF PREFERRED EMBODIMENT

Figure 1:
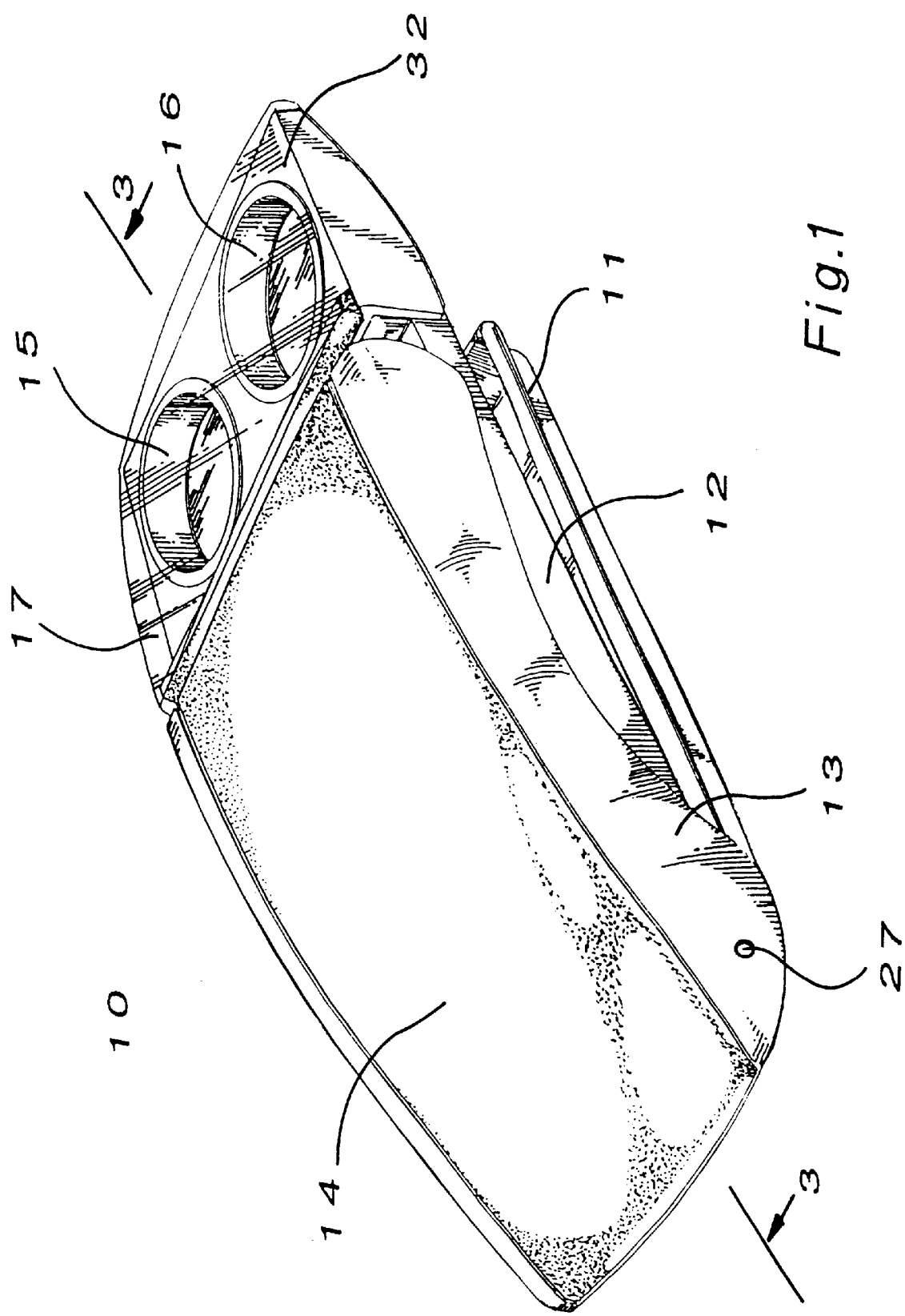
FIG. 1 is a perspective view of a pet feeder incorporating the present invention;.
Figure 2:
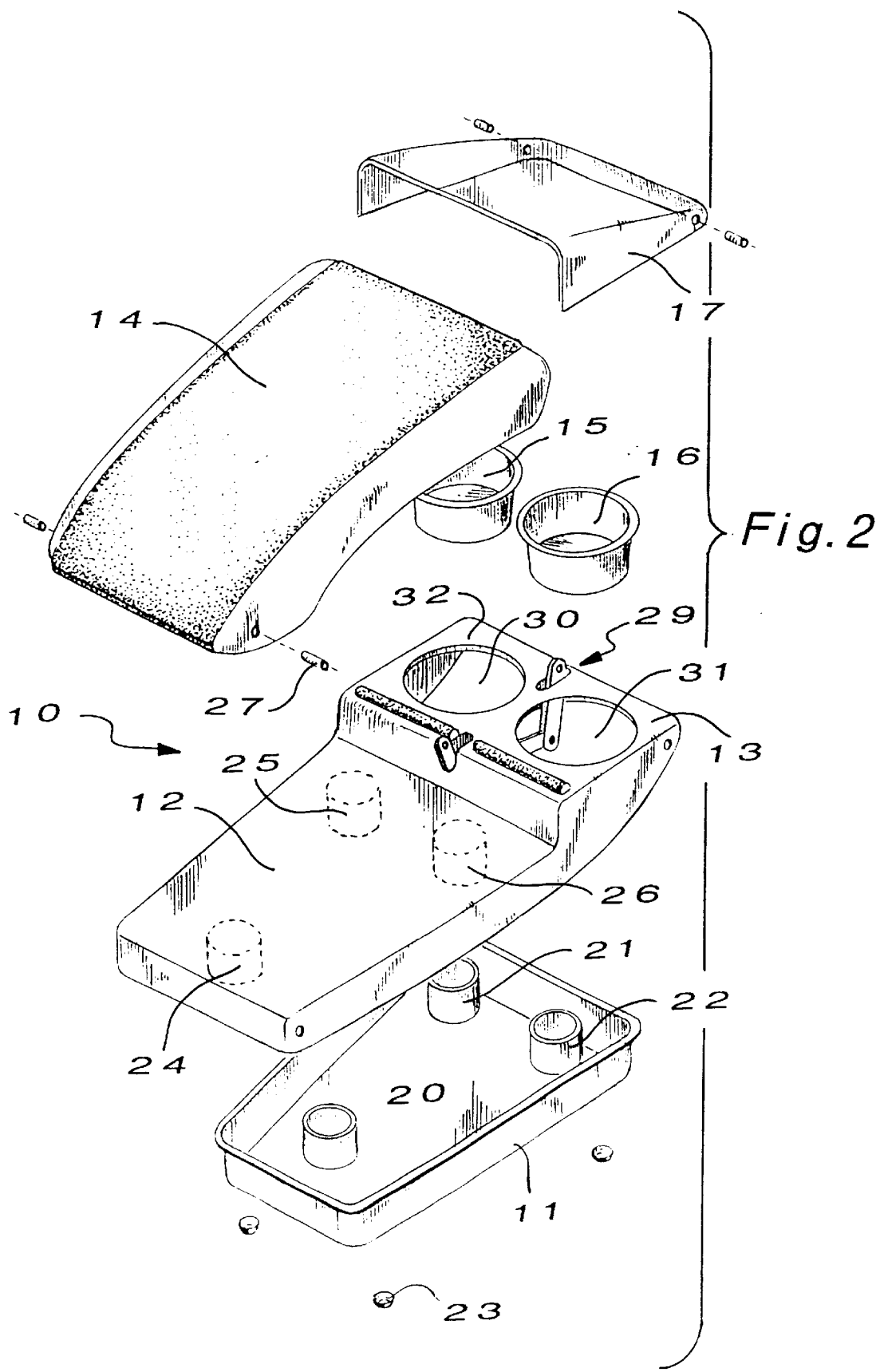
FIG. 2 is an exploded, perspective view of the pet feeder's major assemblies.

Turning now descriptively to the drawings, in which similar reference characters denote similar elements throughout the several views, the FIGS. 1 and 2 illustrate a pest resistant pet food feeder in the direction of arrow 10, which comprises a moat/base 11, a main support platform 12, a feeding platform 13 (with padded surface 14), removable food & water bowls 15 and 16, and a lid 17. The base is formed to hold water like a moat, while supporting and isolating the main support platform 12 above the moat on three ascending columns 20, 21 and 22. The moat/base itself is supported off the ground by 4 non-skid rubber feet, such as foot 23. The main support platform acts as the structure to support the feeding platform, the food and water bowls and the lid. The main support has three descending columns 24, 25 and 26, which telescope into the ascending columns in the moat/base. The main support is removable from the moat/base for easy cleaning and filling of the moat. The feeding platform is hinged to the main support platform by pivot pin 27 and acts as a lever arm, or pressure plate, so the weight of a pet standing on the feeding platform will actuate a linkage assembly 29 and open the lid 17. The upper surface of the feeding platform is covered with the padding which provides improved traction as well as insulation for the pet. Two removable bowls are supplied for food and or water. These are of a canular shape which is large enough to hold a standard sized cat food can and still allow the lid to close. These bowls can be manufactured of plastic, steel or aluminum, and are supported in recesses 30 and 31 located in an upper surface 32 of the main support platform.

Figure 3:
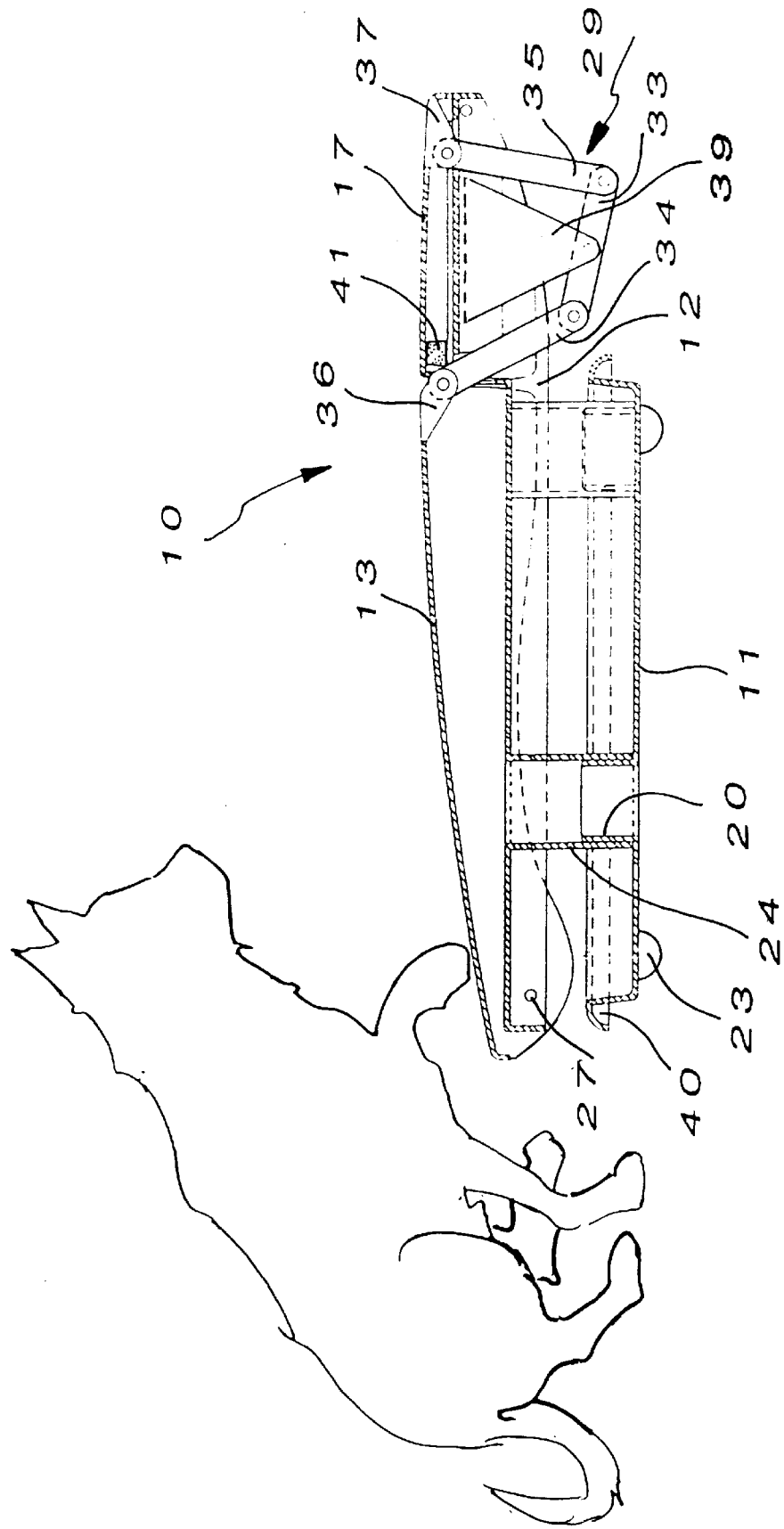
FIG. 3 is a longitudinal cross sectional view of the pet feeder mechanism illustrated in the closed position as taken in the direction of arrows 3—3 of FIG. 1.
Figure 4:
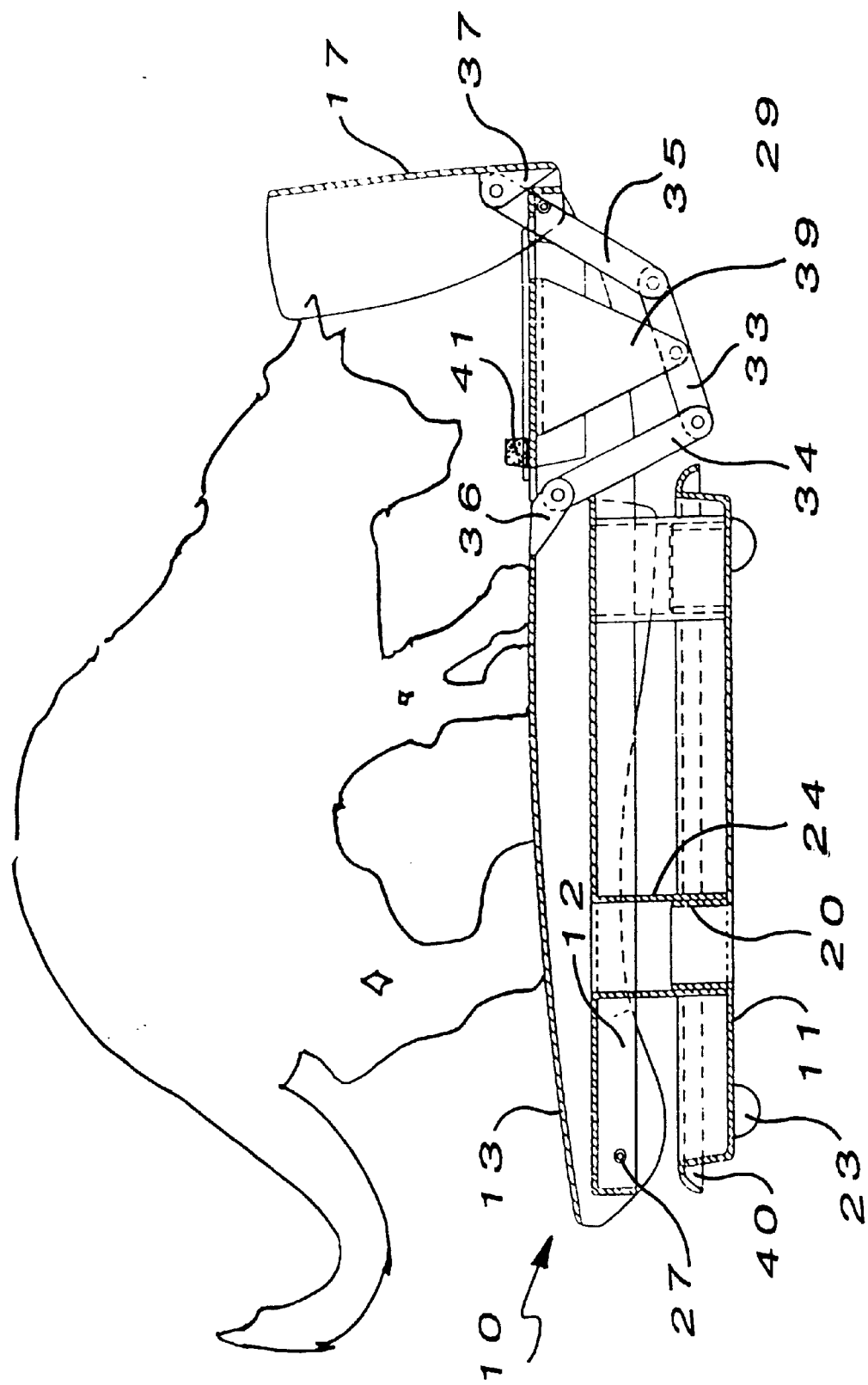
FIG. 4 is a view of the pet feeder similar to the view of FIG. 3 showing the mechanism in the open position.

A linkage assembly shown in FIGS. 3 and 4, translates the downward motion of the feeding platform into the upward motion, or opening motion, of the lid. The assembly is comprised of three main parts, and their pivot fasteners. A lever arm 33 which pivots near its center having ends 34 and 35 pivoting, at either end of the lever. The central lever arm is mounted and pivots near its center on a mounting bracket 39 which descends from the lower surface to the main support structure 12. The bracket is located between and below the supporting recesses for the bowls. The lever pivots vertically on the bracket. Ascending from both ends of the lever are two pivoting links. The upper end of the link 34 towards the foot of the feeder connects to, and pivots on, a bracket 36 descending from the underside of the feeding platform, and transfers downward pressure from the platform to the lever 33. This motion causes the other link 35, whose upper end is secured to and pivots on a bracket 37 which descends from the under side of the lid, to travel upwards and open the lid. The lid covers the food and water bowls, and can be opened automatically when the weight of the pet depresses the feeding platform. The lid pivots vertically on the main support platform. Its having pivot points which mate at both lateral sides of the platform. Located near the center line and descending from the underside of the lid is a bracket to which a linkage is pivoted. The linkage transmits lifting, or opening motion, from the feeder platform, through the linkage assembly and finally to the lid. Also located on the underside of the lid is a gasket of foam or elastomer, which seals the lid against the main support platform.

The base is formed to hold water like a moat, while supporting and isolating the main support platform above the moat on three ascending columns. The moat/base itself is supported off the ground by four non-skid rubber feet. The preferred embodiment is a molded plastic base with a hooked, or returning, flange 40 along its upper lip. However, metal parts created by stamping, breakforming, casting or welding would serve as well, and would be obvious to anyone skilled in the art of manufacture.

The main support platform acts as the structure to support the feeding platform, the food and water bowls and the lid. The main support has descending columns which telescope onto the ascending columns from the moat/base. The main support is removable from the moat/base for easy cleaning and filling of the moat. The preferred embodiment is of injection molded in plastic. However, stamped or break-formed sheet metal constructions would be obvious to those skilled in the art of manufacture.

The feeding platform is hinged to the main support platform and acts as the lever arm or pressure plate so the weight of the pet standing on the feeding platform will actuate the linkage assembly and open the lid. The upper surface of the feeding platform is covered with a rubber padding which provides improved traction as well as insulation for the pet. The preferred embodiment of the feeding platform would be designed and manufactured as a part to be injection molded, or pressure formed, in plastic. However, metal parts created by stamping, casting, breakforming or welding would be obvious to anyone skilled in the art of manufacture.

Two removable bowls are supplied for food and or water. These are of a canular shape which is large enough to hold a standard sized cat food can and still allow the lid to close. These bowls can be manufactured of plastic, steel or aluminum, and are supported in recesses located in the upper surface of the main support platform. The preferred embodiment of these bowls is to be molded in plastic. However, metal parts produced by drawing, stamping, spinning, or casting would be obvious to anyone skilled in the arts of manufacture.

The linkage assembly, as illustrated in FIG. 4, translates the downward motion of the feeding platform into the upward motion, or opening motion, of the lid. The assembly is comprised of three main parts and their pivot fasteners. Lever arm 33, which pivots near its center, and two links secured, and pivoting, at either terminus/end of the lever. The central lever arm is mounted and pivots near its center to a mounting bracket which descends from the lower surface to the main support structure. The bracket is located between and below the two supporting holes for the bowls. The lever pivots vertically about the bracket. Ascending from both ends of the lever are two pivoting linkages. The upper end of the linkage (towards the foot of the feeder) connects to, and pivots on, a bracket descending from the underside of the feeding platform, and transfers downward pressure from the platform to the lever. This motion causes the other linkage, whose upper end is secured to and pivots on a bracket which descends from the under side of the lid, to travel upwards and open the lid. The preferred embodiment of the lever and linkages would be to injection mold the parts in plastic. However, parts produced in metal by die casting, stamping, forging, blanking or extrusion would be obvious to anyone skilled in the art of manufacture.

The lid covers the food and water bowls, and can be opened automatically when the weight of the pet depresses the feeding platform. The lid pivots vertically on the main support platform. Its having pivot points which mate at both lateral sides of the platform. Located near the center line and descending from the underside of the lid is a bracket to which a linkage is pivoted. The linkage transmits lifting, or opening motion, from the feeder platform, through the linkage assembly and finally to the lid. Also located on the underside of the lid is a gasket 41 of foam or elastomer which seals the lid against the main support platform. The preferred embodiment of the lid is to be designed for and manufactured by injection molding plastic. However, plastic parts manufactured by vacuum, pressure forming or blow molded plastics would be suitable as well; as would metal parts produced by stamping, breakforming and die casting. All such designs and methods would be obvious to anyone skilled in the art of manufacture.

The moat/base is held slightly off of the ground by four non-skid feet. The moat/base is in tern filled with water and supports the main support platform above the moat/base on three ascending columns. Telescoping over these columns are three columns which descend from the underside of the main support platform. The telescoping columns are designed to allow for the easy removal of the main support platform from the moat/base so that the moat/base may be more easily cleaned and filled with water. The main support platform in turn supports the feeding platform, the two bowls, the lever arm from the linkage assembly and the lid. The feeding platform pivots vertically from two pivot points located towards the foot of the device. Pivots 42 are located on the lateral sides of the main support platform and the feeder platform. Towards the head of the main support platform, the platform steps up slightly to create a shelf. Through this shelf are cut two holes which locate the two bowls to either side of the centerline of the main support platform. The bowls set into these holes and are supported by their flanges, which are molded into the upper lip of each bowl. Between the holes for the bowls, and running in line with the centerline, is a pivot bracket which descends from the underside of the main support platform. Pivoting near its center on this bracket is the lever for the linkage assembly. Pivoting from both ends of the lever are two ascending links. One link connects to a pivot bracket on the underside of the feeder platform and the other connects to a pivot bracket located on the underside of the lid. The lid is connected to the main support platform by two pivots which are located to the lateral sides of both the main support platform and the lid and are situated towards the head end of both parts. Alternatively, the main components of our device may be secured, actuated and supported in different fashions. The moat/base may be supported by integrated feet or without feet at all. The main support platform may be supported by the moat/base via, snaps, fasteners, ascending walls or other methods which would be obvious to anyone skilled in the arts of manufacture. The feeding platform could be hinged instead of pivoted to the main support platform, as could the lid. The motion provided by linkage assembly could be aided by springs, weights, air pots or shocks. This assembly could be replaced altogether with an electromechanical device and a sensor.

The pest resistant pet feeder is placed in a convenient feeding location. Its moat/base is filled with water to provide a barrier to small crawling insects. After the food and water bowls are filled and in place, the feeder's lid is allowed to fall closed, sealing the food and water away from hopping or flying pests as well. When a pet wishes to feed, it simply steps onto the padded feeding platform and the platform is depressed by the weight of the animal. The downward motion of the feeding platform is transmitted through the linkage, which descends from the feeding platform to the foot end of the lever. While this linkage pushes its end of the lever downward, the lever pivots at its central fulcrum, and the opposite end of the lever is pushed upward. Its upward motion is transmitted through a linkage which ascends from the lever's end to a pivot bracket located on the bottom surface of the lid. As the lid's pivot bracket is pushed upward, it causes the lid to pivot, or hinge, upward in relation to the main support platform. As the lid's pivot, or hinging point, is located near the extreme head end of the main support platform and the lid, the lid lifts at its foot end, providing the pet access to both food and water while it is standing on the feeding platform. Once the animal steps off of the feeding platform gravity pulls the lid downward, thus re-sealing the food and water bowls until the animal wishes to feed again.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A pest resistant pet feeder comprising:
   a base;
   a main support detachably secured on said base;
   a feeding platform having a pivot end connected to said main support and a feeder end provided with removable feeding dishes;
   a lid pivotally carried on said feeder end of said platform and adapted to be positioned between a first position covering said dishes and a second position uncovering said dishes;
   a linkage assembly interconnecting said feeder end of said platform and said lid for deploying said lid between said first and said second position responsive to pivotal movement of said platform with respect to said main support;
   said base includes a surrounding sidewall jointed by a bottom;
   support columns detachably joined with said bottom in spaced-apart relationship with respect to said sidewall; and
   insect repellent situated on said bottom separating said columns from said sidewall.

2. The pet feeder defined in claim 1 wherein:
   said lid is in a sealing position with respect to said platform when said lid is in said first position.

3. The pet feeder defined in claim 2 wherein:
   said linkage assembly includes a mount downwardly depending from said lid;
   a lever arm having a midsection pivotally coupled with said mount;
   said lever arm having ends connected by said midsection;
   a first link pivotally connected to one end of said lever arm and said platform respectively; and
   a second link pivotally connected between the other end of said lever arm and said lid, wherein pivotal movement of said platform actuates said linkage assemblage so that said lever arm rotates about said mount to raise and lower said first and said second links.

4. The pet feeder defined in claim 3 wherein:
   said lid is composed of a transparent material permitting visual observation of said dishes.

5. The pet feeder defined in claim 4, wherein:
   said columns are at least three in number; and
   each column includes a post secured to said bottom of said base and a sleeve downwardly depending from said main support for insertably receiving said post in telescopic relationship.

6. The pest resistant pet feeder comprising:
   a stationary base having a bottom with a peripheral sidewall terminating in an arcuate lip;
   a plurality of posts fixed on said bottom in spaced-apart relationship;
   a main support having a pivot end and a feeding end joined by a midsection;
   a plurality of sleeves downwardly depending from said midsection detachably engageable with said plurality of posts to provide a plurality of columns removably supporting said main support on said stationary base;
   said columns are disposed within confines of said sidewall;
   feeding dishes removably carried on said feeding end;
   a feeding platform having a selected end pivotally coupled with said pivot end of said main support and having a non-selected end terminating in movable relationship with respect to said feeding end;
   a lid composed of a transparent material pivotally carried on said feeding end for alternately positioning said lid to cover and uncover said feeding dishes; and
   a linkage assembly operably interconnecting said non-selected end of said feeding platform with said lid for actuating said lid into said alternative positions in response to weighted depression of said non-selected end causing pivoting of said feeding platform.

7. The pet feeder defined in claim 6 wherein:
   said linkage assembly includes a downwardly depending mount secured to said feeding end of said main support;
   a center link having opposite ends joined by a midsection;
   a pivot connection joining said center link midsection with said mount;
   a first link having opposite ends pivotally connected to said non-selected end of said feeding platform and said center link respectively; and
   a second link having opposite ends pivotally connected between said lid and said center link respectively whereby pivotal movement of said feeding platform causes said center link to rotate forcibly urging said lid to said alternate positions via said second link.

8. The pet feeder defined in claim 7 including:
   cushion pad carried on said feeder platform.

9. The pet feeder defined in claim 8 including:
   a cushioning seal secured to said feeding end of said main support engageable with said lid when said lid is in its cover position.

10. The pet feeder defined in claim 9 wherein:
    said linkage assembly being situated in a center location with respect to said feeding end and said lid.

11. The pet feeder defined in claim 10 wherein:
    said feeding platform pivots in response to weighted presence of said feeder platform causing pivotal response of said feeder platform to actuate said linkage assembly.

* * * * *